US010087925B2

(12) United States Patent
Douglas et al.

(10) Patent No.: US 10,087,925 B2
(45) Date of Patent: Oct. 2, 2018

(54) PNEUMATIC DISTRIBUTION SYSTEM USING SHARED PUMP PLENUM

(71) Applicant: Nextern Inc., Saint Paul, MN (US)

(72) Inventors: Ryan Douglas, Stillwater, MN (US); Casey Carlson, Independence, MN (US); Dennis Berke, River Falls, MN (US); Ken Vojacek, Fridley, MN (US)

(73) Assignee: Nextern, Inc., White Bear Lake, MN (US)

( * ) Notice: Subject to any disclaimer, the term of this patent is extended or adjusted under 35 U.S.C. 154(b) by 0 days.

(21) Appl. No.: 14/946,438

(22) Filed: Nov. 19, 2015

(65) Prior Publication Data

US 2016/0160880 A1 Jun. 9, 2016

Related U.S. Application Data

(60) Provisional application No. 62/088,032, filed on Dec. 5, 2014.

(51) Int. Cl.

| | |
|---|---|
| ***F15B 13/08*** | (2006.01) |
| ***F16K 11/20*** | (2006.01) |
| ***F04B 49/10*** | (2006.01) |

(52) U.S. Cl.

CPC ........ *F04B 49/106* (2013.01); *F15B 13/0814* (2013.01); *Y10T 137/877* (2015.04); *Y10T 137/87877* (2015.04)

(58) Field of Classification Search

CPC ......... Y10T 137/877; Y10T 137/87877; F15B 13/0814; F15B 13/0817; F16K 11/20

See application file for complete search history.

(56) References Cited

U.S. PATENT DOCUMENTS

| | | | | | |
|---|---|---|---|---|---|
| 177,965 | A * | 5/1876 | Shirley | F16K 11/22 | 137/883 |
| 456,546 | A * | 7/1891 | Blankerts | F16K 11/22 | 137/883 |
| 1,649,735 | A * | 11/1927 | Roschanek | F16K 17/32 | 137/456 |
| 1,786,969 | A * | 12/1930 | Van Der Heuel | A45D 20/44 | 137/266 |

(Continued)

*Primary Examiner* — Seth W Mackay-Smith

(74) *Attorney, Agent, or Firm* — Craige Thompson; Thompson Patent Law

(57) ABSTRACT

Apparatus and associated methods relate to a pneumatic distribution system having pneumatic pump that exhausts into a common plenum that is in fluid communication with a plurality of flow controllers. In an illustrative embodiment, a system controller may coordinate the operation of the one or more pneumatic pumps and the plurality of flow controllers to provide air pressure control to a system of pneumatic chambers. In some embodiments, one of the plurality of flow controllers may be configured to provide fluid communication with an ambient atmosphere so as to permit a fluid path from a pneumatic chamber connected to another flow controller to the ambient atmosphere via both flow controllers and the common plenum. In an exemplary embodiment, the system controller may advantageously control the air pressures in a plurality of pneumatic chambers independently of one another using coordinated control of the pump and flow controllers.

14 Claims, 3 Drawing Sheets

(56) References Cited

U.S. PATENT DOCUMENTS

| | | | | | |
|---|---|---|---|---|---|
| 3,928,711 | A * | 12/1975 | Jakobsen | H02G 15/26 | 137/883 |
| 4,465,094 | A * | 8/1984 | Huffhines | G01V 1/133 | 137/557 |
| 4,838,309 | A * | 6/1989 | Goodwin | A61G 7/05776 | 137/554 |
| 4,870,994 | A * | 10/1989 | Raymond | F17C 1/00 | 137/382 |
| 5,566,717 | A * | 10/1996 | Robert | G05D 16/206 | 137/487.5 |
| 5,927,337 | A * | 7/1999 | LaMantia | F15B 13/0807 | 137/883 |
| 6,796,332 | B1 * | 9/2004 | Nguyen | G05D 11/132 | 137/14 |
| 7,389,797 | B1 * | 6/2008 | Headley | B01D 46/0068 | 137/883 |
| 2002/0043288 | A1 * | 4/2002 | Seitz | F15B 13/0814 | 137/883 |
| 2002/0074047 | A1 * | 6/2002 | Gagnon | G05D 7/0664 | 137/883 |
| 2004/0226621 | A1 * | 11/2004 | Phillips | F16K 17/26 | 137/883 |
| 2005/0263196 | A1 * | 12/2005 | Hsieh | F17D 1/04 | 137/883 |

* cited by examiner

PNEUMATIC DISTRIBUTION SYSTEM USING SHARED PUMP PLENUM

CROSS-REFERENCE TO RELATED APPLICATIONS

This application claims the benefit of U.S. Provisional Application Ser. No. 62/088,032, titled "Pneumatic Distribution System Using Shared Pump Plenum," filed by Douglas, et al., on Dec. 5, 2014. This application also incorporates the entire contents of the foregoing application herein by reference.

TECHNICAL FIELD

Various embodiments relate generally to pneumatic pumps with low-acoustic output.

BACKGROUND

Pneumatic pumps are compressors of air. Pneumatics are a branch of fluid power, which includes both pneumatics and hydraulics. Pneumatics may be used in many industries, factories, and applications. Pneumatic instruments are powered by compressed air. For example, many dental tools are powered by compressed air. Auto mechanics may use air tools when repairing or replacing parts on vehicles. Pneumatic pumps may inflate inflatable devices, such as tires, air mattresses, and pressure inducing medical devices.

SUMMARY

Apparatus and associated methods relate to a pneumatic distribution system having pneumatic pump that exhausts into a common plenum that is in fluid communication with a plurality of flow controllers. In an illustrative embodiment, a system controller may coordinate the operation of the one or more pneumatic pumps and the plurality of flow controllers to provide air pressure control to a system of pneumatic chambers. In some embodiments, one of the plurality of flow controllers may be configured to provide fluid communication with an ambient atmosphere so as to permit a fluid path from a pneumatic chamber connected to another flow controller to the ambient atmosphere via both flow controllers and the common plenum. In an exemplary embodiment, the system controller may advantageously control the air pressures in a plurality of pneumatic chambers independently of one another using coordinated control of the pump and flow controllers.

Various embodiments may achieve one or more advantages. For example, some embodiments may provide a pneumatic pump that provides airflow to a number of different destinations. In some embodiments, the airflow to one or more destinations may be independently controlled via a flow controller. In some embodiments, such independent control may permit multiple uses to independently control a destination device using a single pump. Reduced cost of a pneumatic system may result from such a system configuration. In some embodiments, reduced system complexity may result in one or more of the following benefits: reduced maintenance requirement, reduced cost, smaller system size, lighter system weight, and greater system reliability. In an exemplary embodiment, two or more pumps may share a common plenum with a multiplicity of flow controllers to provide redundancy in the event of pump failure.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

To aid understanding, this document is organized as follows. First, some advantages of a pneumatic pump are briefly introduced using an exemplary scenario of use with reference to FIG. 1. Second, with reference to FIG. 2, an exemplary airflow engine with both pump and flow controllers will be discussed. Third, exemplary operation of an airflow engine having both pump and flow controllers will be described, with reference to FIG. 3.

Figure 1:
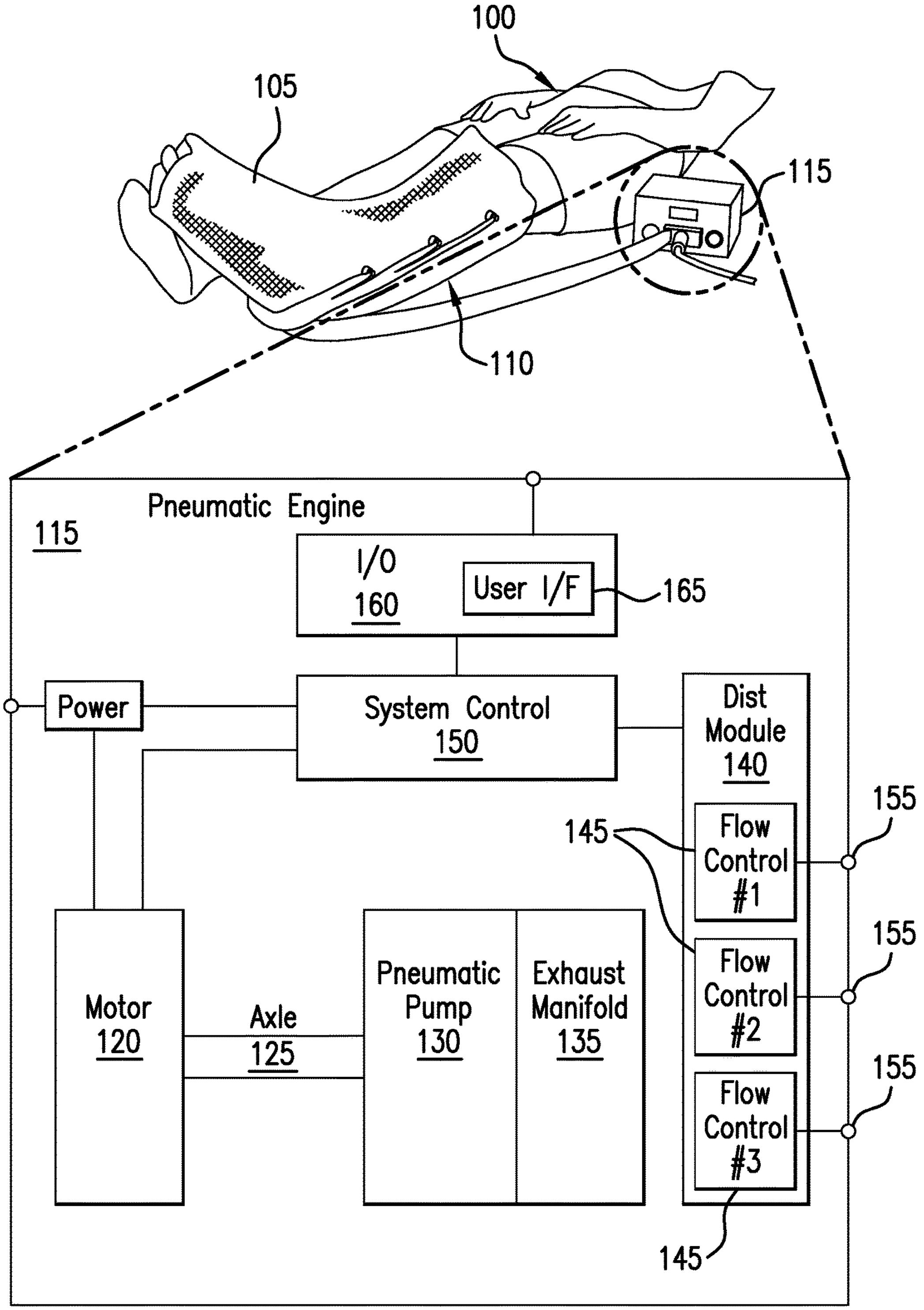
FIG. 1 depicts an exemplary flow pump providing pneumatic pressure to immobilize an injured patient's leg.

FIG. 1 depicts an exemplary flow pump providing pneumatic pressure to immobilize an injured patient's leg. In FIG. 1, a patient 100 is wearing an exemplary compression boot 105. The compression boot may have an inflatable bladder on an interior region to provide compression to a leg 110 of the patient 100. The inflatable bladder may be inflated by a pneumatic engine 115. The pneumatic engine 115 may include a motor 120 that rotates an axle 125. The axle 125 may transmit this rotational energy to a pneumatic pump 130. The pneumatic pump 130 delivers air to an output manifold 135.

A distribution module 140 may be coupled to the output manifold 135. The distribution module 140 may have one or more flow controllers 145. Each flow controller 145 may receive a control signal from a system controller 150. Each of the flow controllers 145 may have an exit port 155 configured to provide connection to a pneumatic line and/or device. The system controller 150 may receive and/or transmit signals to an input/output interface 160. The input/output interface 160 includes a user interface module 165. The input/output interface 160 may communicate with a communications network. The input/output interface 160 may report system status information to a logging center. In some embodiments the system controller 150 may receive operating command signals from the user interface module 165. The input/output interface 160 may communicate using wired communications protocols and/or networks. The input/output interface 160 may communicate using wireless communications protocols and/or networks. For example, the system controller 150 may receive operating command signals from a mobile device, and/or transmit status information to the mobile device.

Figure 2:
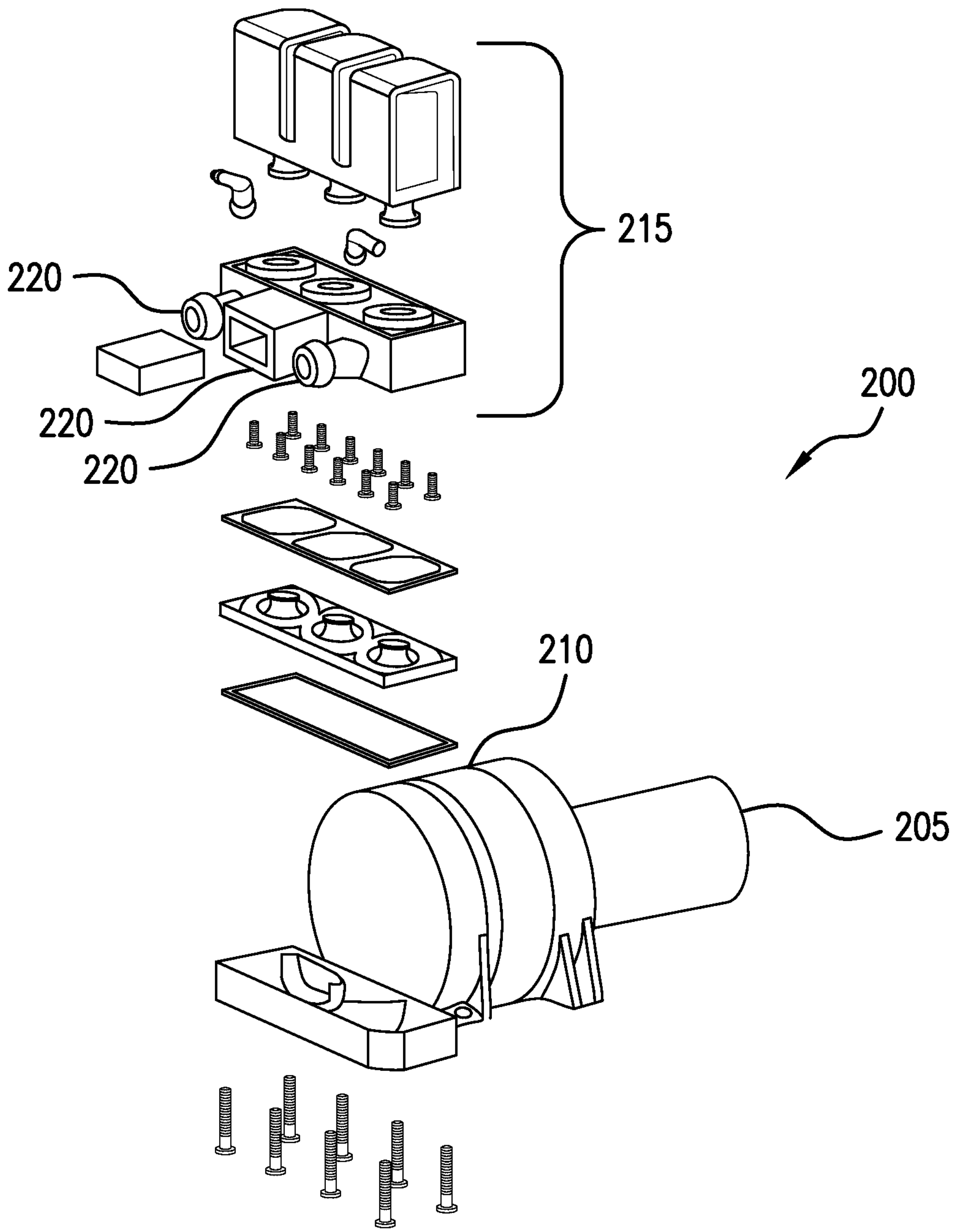
FIG. 2 depicts a perspective view of an exemplary pneumatic engine having a pump and a plurality of flow controllers.

FIG. 2 depicts a perspective view of an exemplary pneumatic engine having a pump and a plurality of flow controllers. In the FIG. 2 depictions, an exemplary airflow engine 200 includes a motor 205, a pneumatic pump 210 and a series of flow controllers 215. Each flow controller 215 may have an input port in fluid communication with an output port of the pneumatic pump 210. In some embodiments, each flow controller may then present an output port 220 configured to delivery compressed air and/or vacuum to a device. In some embodiments the flow controller may be electrically controlled. In an exemplary embodiment, the flow controller may be pneumatically controlled. In some embodiments, the flow controller may be binary (e.g. on/off) . In some embodiments, a flow controller may regulate the fluid conductivity and/or flow of the air and/or vacuum, for example.

Figure 3:
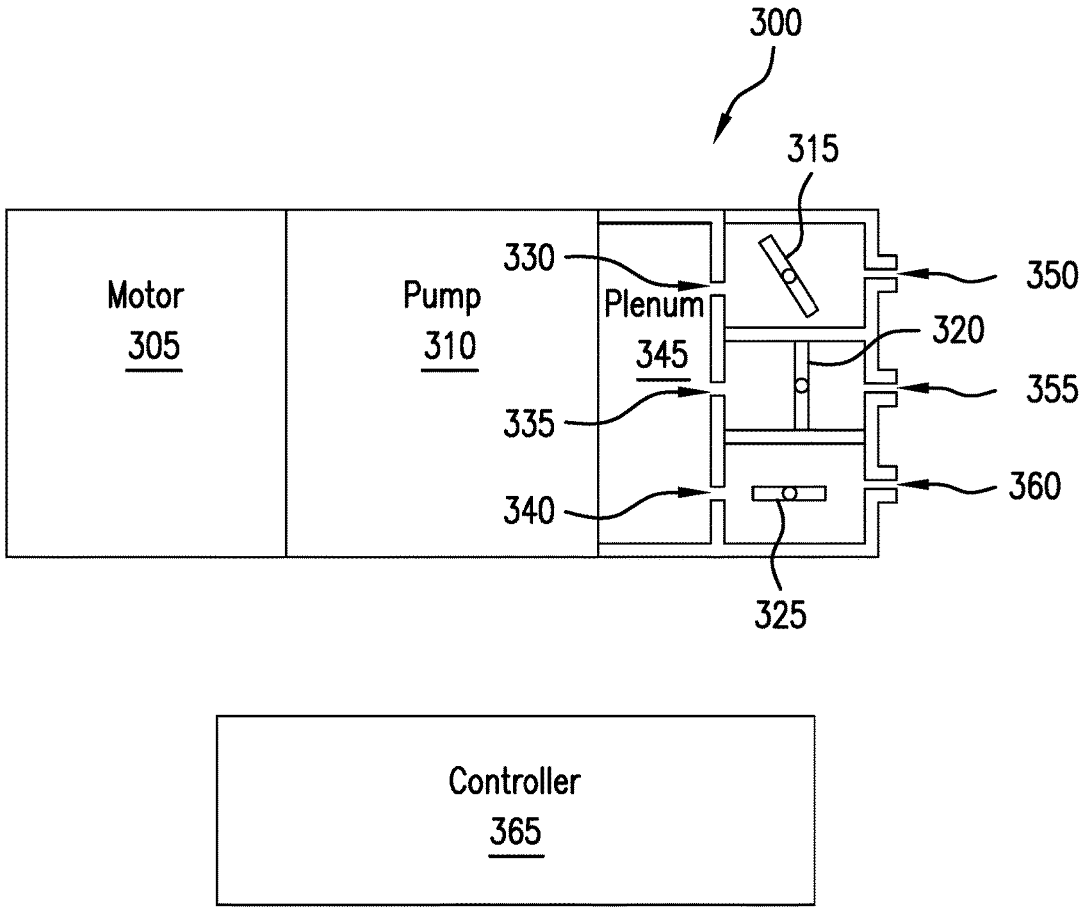
FIG. 3 depicts a block diagram of an exemplary airflow engine having three valves sharing a common exhaust plenum of a pneumatic pump.

FIG. 3 depicts a block diagram of an exemplary airflow engine having three valves sharing a common exhaust plenum of a pneumatic pump. In the FIG. 3 block diagram, an exemplary airflow engine 300 includes a motor 305, a pneumatic pump 310 and three flow controllers 315, 320, 325. The three flow controllers 315, 320, 325 each have a source port 330, 335, 340 that provides fluid communication between the flow controllers 315, 320, 325 and an exhaust plenum 345 of the pneumatic pump 310. Each of the flow controllers 315, 320, 325 also has a destination port 350, 355, 360. Each flow controller 315, 320, and 325 may control the fluid communication between its respective source 330, 335, 340 and destination 350, 355, 360 port.

In some embodiments, a controller 365 may control the operation of the pneumatic pump 310 via control of the motor 305. The controller 365 may also control the operation of the flow controllers 315, 320, 325. For example, when the controller determines that a pneumatic chamber that is in fluid communication with the destination port 350 of the flow controller 315 is low in pressure, the controller 365 may provide energizing power to the motor 305 and provide a signal to the flow controller 315 to permit fluid communication between the source port 330 and the destination port 350. The motor driven pneumatic pump 310 may provide air to the exhaust plenum 345. Air may then flow from the exhaust plenum 345 through the source port 330, through the flow controller 315, through the destination port 350 and into the pneumatic chamber. The controller 365 may then remove operating power from the motor 305 and provide a signal to the flow controller 315 to prevent fluid communication between the source port 330 and the destination port 350 when the controller determines that the pneumatic chamber has the proper air pressure.

If, for example the controller 365 determines that a pneumatic chamber that is in fluid communication with the destination port 360 has too much air pressure, the controller 365 may send signals to both the flow controllers 320 and 325 to permit fluid communication between the source ports 340, 335 and the destination ports 360, 355, respectively. The destination port 355 may be in fluid communication with the room atmosphere, for example. With these fluid communication paths, air may flow from the pneumatic chamber to the exhaust plenum 345 via the flow controller 325, and then from the exhaust plenum 345 to the room atmosphere 355 via the flow controller 320. When the controller 365 determines that the air pressure of the pneumatic chamber is acceptable, the controller 365 may send signals to both of the flow controllers 320 and 325 to prohibit fluid communication between the source ports 340, 335 and the destination ports 360, 355, respectively.

In some embodiments, more or fewer flow controllers may be in fluid communication with an exhaust plenum. For example, in an exemplary embodiment, seven flow controllers may each have a source port in fluid communication with an exhaust plenum of a pneumatic pump. In some embodiments, a flow controller may provide continuously variable fluid conduction between a source port and a destination port. In some embodiments, a flow controller may provide two states of fluid communication between a source port and a destination port: and on state and an off state, for example. In some embodiments, each flow controller may have a flow restrictor that has a predetermined measure of fluid conductivity.

In an exemplary embodiment two or more pumps may provide flow to a common plenum. In some embodiments, two or more pumps may each provide different pumping capability. For example one pump may provide low flow capability and another pump may provide high flow capability. In such an embodiment, quiet operation may be facilitated by a small low flow capable pump, while simultaneously permitting high flow operation if necessary. In some embodiments, a backup pump may provide protection in case of a failure of a pump failure.

In some embodiments, each flow controller may be independently controlled. In an exemplary embodiment, the flow controllers may be ganged together and operate synchronously. In some embodiments, a combination of independent and dependent groups of flow controllers may all share a common pump exhaust plenum as a source of air.

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. A multi-output airflow engine comprising:

a plenum enclosure that defines a plenum chamber, the plenum chamber comprising:

an input aperture; and, at least one separator wall defining a first valve chamber and a second valve chamber, wherein:

the first valve chamber comprises a first valve aperture and an independently-controllable first flow controller configured to selectively restrict fluid flow through the first valve aperture in response to a first flow control signal; and, the second valve chamber comprises a second valve aperture and an independently-controllable second flow controller configured to selectively restrict fluid flow through the second valve aperture in response to a second flow control signal;

a pump housing disposed directly adjacent to, and integrated with, the plenum enclosure, the pump housing comprising an output port configured to output pressurized fluid generated by a pressure source that is in direct fluid communication with the output port and, a control module configured to generate commands for the first and second flow control signals so as to coordinate fluid communication among the first valve chamber, the second valve chamber, and the plenum chamber, wherein there is direct physical contact between the output port and the input aperture to provide for direct fluid communication between the pressure source and the plenum chamber, wherein the first chamber is configured to define a first fixed direct flow path between the plenum chamber and the first valve aperture, and the second chamber is configured to define a second fixed direct flow path between the plenum chamber and the second valve aperture, wherein each flow controller is configured to dynamically change its operational state to selectively direct fluid flow through the plenum chamber, wherein when the control module determines that a pneumatic chamber in fluid communication with the first valve aperture is above a predetermined pressure level, the control module sends the first and second flow control signals to permit fluid flow from the pneumatic chamber to the second valve chamber via the first valve chamber and the plenum chamber.

2. The multi-output airflow engine of claim 1, wherein a direction of fluid flow for the first fixed direct flow path is from the output port to the first valve chamber through the plenum chamber.

3. The multi-output airflow engine of claim 1, wherein a direction of fluid flow is from the first valve chamber to the second valve chamber via the plenum chamber.

4. The multi-output airflow engine of claim 1, wherein when the control module determines that a pneumatic chamber in fluid communication with the first valve aperture is below a predetermined pressure level, the control module sends the first flow control signal to permit fluid flow from the output port to the pneumatic chamber via the plenum chamber and the first valve chamber.

5. The multi-output airflow engine of claim 1, further comprising a user interface module configured to transmit operating command signals to the control module.

6. The multi-output airflow engine of claim 1, further comprising the pressure source, wherein the pressure source is a pneumatic pump.

7. The multi-output airflow engine of claim 6, further comprising a motor configured to power the pneumatic pump.

8. A multi-output airflow engine comprising:

a plenum enclosure that defines a plenum chamber, the plenum chamber comprising:

an input aperture; and, at least one separator wall defining a first valve chamber and a second valve chamber, wherein:

the first valve chamber comprises a first valve aperture and an independently-controllable first flow controller configured to selectively restrict fluid flow through the first valve aperture in response to a first flow control signal; and, the second valve chamber comprises a second valve aperture and an independently-controllable second flow controller configured to selectively restrict fluid flow through the second valve aperture in response to a second flow control signal;

a pump housing disposed directly adjacent to, and integrated with, the plenum enclosure, the pump housing comprising an output port configured to output pressurized fluid generated by a pressure source that is in direct fluid communication with the output port; and, a control module configured to generate commands for the first and second flow control signals so as to coordinate fluid communication among the first valve chamber, the second valve chamber, and the plenum chamber, wherein there is direct physical contact between the output port and the input aperture to provide for direct fluid communication between the pressure source and the plenum chamber, wherein the first chamber is configured to define a first fixed direct flow path between the plenum chamber and the first valve aperture, and the second chamber is configured to define a second fixed direct flow path between the plenum chamber and the second valve aperture, wherein when the control module determines that a pneumatic chamber in fluid communication with the first valve aperture is above a predetermined pressure level, the control module sends the first and second flow control signals to permit fluid flow from the pneumatic chamber to the second valve chamber via the first valve chamber and the plenum chamber.

9. The multi-output airflow engine of claim 8, wherein a direction of fluid flow for the first fixed direct flow path is from the output port to the first valve chamber through the plenum chamber.

10. The multi-output airflow engine of claim 8, wherein a direction of fluid flow is from the first valve chamber to the second valve chamber via the plenum chamber.

11. The multi-output airflow engine of claim 8, wherein when the control module determines that a pneumatic chamber in fluid communication with the first valve aperture is below a predetermined pressure level, the control module sends the first flow control signal to permit fluid flow from the output port to the pneumatic chamber via the plenum chamber and the first valve chamber.

12. The multi-output airflow engine of claim 8, further comprising a user interface module configured to transmit operating command signals to the control module.

13. A multi-output airflow engine comprising:

a plenum enclosure that defines a plenum chamber, the plenum chamber comprising:

an input aperture; and, at least one separator wall defining a first valve chamber and a second valve chamber, wherein:

the first valve chamber comprises a first valve aperture and an independently-controllable means for selectively restricting fluid flow through the first valve aperture in response to a first flow control signal; and, the second valve chamber comprises a second valve aperture and an independently-controllable means for selectively restricting fluid flow through the second valve aperture in response to a second flow control signal;

a pump housing disposed directly adjacent to, and integrated with, the plenum enclosure, the pump housing comprising an output port configured to output pressurized fluid generated by a pressure source that is in direct fluid communication with the output port; and, a control module configured to generate commands for the first and second flow control signals so as to coordinate fluid communication among the first valve chamber, the second valve chamber, and the plenum chamber, wherein there is direct physical contact between the output port and the input aperture to provide for direct fluid communication between the pressure source and the plenum chamber, wherein the first chamber is configured to define a first fixed direct flow path between the plenum chamber and the first valve aperture, and the second chamber is configured to define a second fixed direct flow path between the plenum chamber and the second valve aperture, wherein when the control module determines that a pneumatic chamber in fluid communication with the first valve aperture is above a predetermined pressure level, the control module sends the first and second flow control signals to permit fluid flow from the pneumatic chamber to the second valve chamber via the first valve chamber and the plenum chamber.

14. The multi-output airflow engine of claim 13, wherein when the control module determines that a pneumatic chamber in fluid communication with the first valve aperture is below a predetermined pressure level, the control module sends the first flow control signal to permit fluid flow from the output port to the pneumatic chamber via the plenum chamber and the first valve chamber.

* * * * *